United States Patent [19]

Firnhaber et al.

[11] Patent Number: 4,632,766
[45] Date of Patent: Dec. 30, 1986

[54] METHOD OF TREATMENT OF WASTE WATER OBTAINED IN A GASIFICATION PLANT DURING WASHING OF RAW GAS

[75] Inventors: Bernhard Firnhaber; Adolf Linke, both of Essen; Rolf Wetzel, Heiligenhaus, all of Fed. Rep. of Germany

[73] Assignee: Krupp-Koppers GmbH, Essen, Fed. Rep. of Germany

[21] Appl. No.: 620,554

[22] Filed: Jun. 14, 1984

[30] Foreign Application Priority Data

Aug. 11, 1983 [DE] Fed. Rep. of Germany ....... 3328989

[51] Int. Cl.$^4$ ............................................. C02F 1/72
[52] U.S. Cl. .................................. 210/752; 210/758; 210/760; 210/765
[58] Field of Search ............... 210/758, 760, 763, 765, 210/904, 916, 752

[56] References Cited

U.S. PATENT DOCUMENTS

| | | | |
|---|---|---|---|
| 3,627,470 | 12/1971 | Hamblin | 210/758 X |
| 3,856,671 | 12/1974 | Lee et al. | 210/760 |
| 4,002,565 | 1/1977 | Farrell et al. | 210/765 X |
| 4,341,641 | 7/1982 | Novak | 210/904 X |
| 4,478,725 | 10/1984 | Velling et al. | 210/765 X |

*Primary Examiner*—Tom Wyse
*Attorney, Agent, or Firm*—Michael J. Striker

[57] ABSTRACT

In a method of treating waste water obtained in a direct washing with water of raw gas in a plant for a gasification of gas, the waste water is first settled in a settling tank and a resultant concentrated slime-containing water is subjected to a multi-stage oxidation with air or oxygen only at the temperatures of between 20° C., and 80° C., and the slime-containing water obtained after the oxidation is conveyed to a filtration system or a slime-depositing container.

13 Claims, 1 Drawing Figure

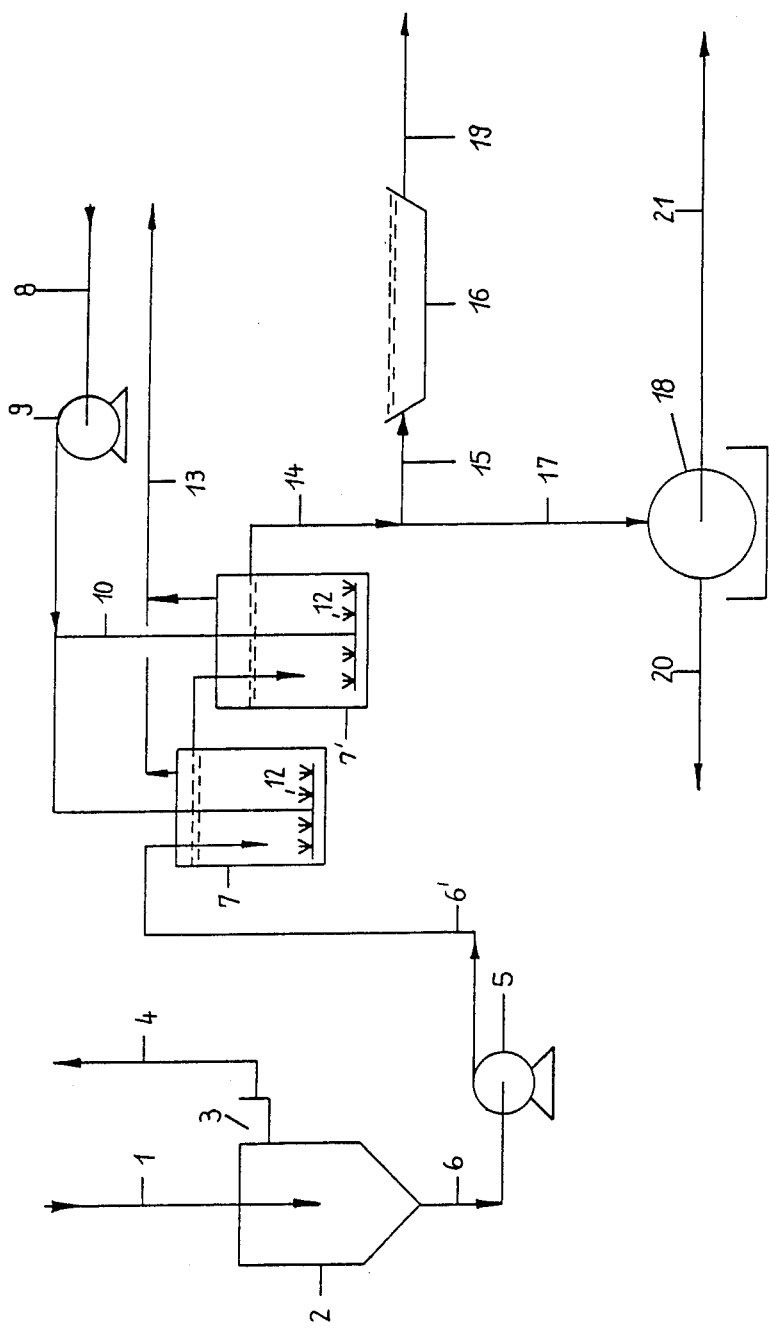

METHOD OF TREATMENT OF WASTE WATER OBTAINED IN A GASIFICATION PLANT DURING WASHING OF RAW GAS

BACKGROUND OF THE INVENTION

The present invention pertains to a method of processing waste water obtained in a direct washing stage of raw gas in a plant for gasification of coal.

Methods of processing waste water of the type under discussion have been known. With such a method, the waste water is first treated in a settling tank, from which the cleared washing water is recycled into a washing process in the coal-gasification plant while the concentrated slime-containing water is fed into a slime-depositing tank or into a filter system and there is further treated.

Raw gas from plants for a gasification of coal contains coal ash and a non-gasified coal substance in the form of fine dust. This flying dust is usually washed off the raw gas by direct washing with water and drops in the suspension form during the direct washing stage. The washing water, during the direct washing stage, receives from the row gas gaseous noxious materials, such as $H_2S$, HCN and $NH_3$, which, depending on their concentration in the raw gas, gas pressure, pH-value and the temperature of water, have various solubilities in the washing water; The soluble gas components partially further react in water for example they are dissociated.

It has been known in industrial practice to feed a washing water dust-suspension or waste water, obtained during the direct washing of raw gas, into the settling tank, in which dust has been settled due to stabilizing of streams of washing water. The cleared water has been then, after cooling, recycled into the direct washing stage. The concentrated slime-containing water has been in many cases pumped into the slime-depositing place or container, in which dust, settled for a longer period of time, was evaporated. During the treatment in the settling tank and during the depositing in the slime-depositing container there has been a danger that a portion of gaseous noxious materials physically dissolved in waste water would escape into the atmosphere, which would lead to a non-allowable contamination of the atmosphere. Although special constructions of the settling tanks have been utilized, provided with shields or covers, preventing gaseous noxious materials from escaping into the atmosphere, there was no such a possibility for slime-depositing containers or places due to relatively large surfaces which must have been covered. Such a measure has not been yet realized as a rule in practice, also because of high costs.

Research has been conducted, which showed that the concentrated slime-containing water is conditioned by filtration. The resultant filtrate can be then totally or partially recycled to the stage of washing raw gas or can be subjected to a waste water purification. Moist filter cakes, produced in the filtration process, can be deposited or burned out. In both instances, however, there is a danger that the remaining moisture components of the filter cake containing noxious materials would escape into the atmosphere or ground waters.

SUMMARY OF THE INVENTION

It is an object of the present invention to provide an improved method of treatment of waste water obtained in a gas-gasification plant during the washing of raw gas.

It is a further object of this invention to provide a method of conditioning waste water, which would prevent gaseous noxious materials from escaping into the atmosphere or prevent noxious materials dissolved in water from escaping into ground water.

It is yet another object of the invention to decrease to a possible degree the amount of water expelled from the process of gasification of gas and thus to significantly improve an internal water circulation in the plant.

These and other objects of the present invention are attained by a method of treatment of waste water obtained in a direct washing of raw gas with water in a plant for a gasification of gas, comprising the steps of treating waste water in a settling tank to obtain a clarified water, which is recycled to the plant, and a concentrated slime-containing water; subjecting said concentrated slime-containing water to oxidation with oxygen-containing medium at temperatures from 20° C. to 80° C. in at least one oxidation stage; and conveying a resultant slime-containing water produced in said oxidation stage for further treatment.

Preferably, the temperatures during the oxidation step may be within the range 35° C.-70° C.

The oxidation medium may be atmospheric air, or oxygen, or ozonized air.

The resultant slime-containing water obtained in the oxidation step may be conveyed either to a slime-depositing means or to a filter system.

The oxidation step may be performed at two or more stages.

There has been known the treatment of waste water, in which such noxious materials as $H_2S$ and HCN have been been decomposed by the addition to the waste water of strong oxidation means, such as ozon, hydrogen-peroxide or chlorine. The known methods, however have required high amounts of relatively expensive oxidation means. Moreover, the problem of dosaging those oxidation means has made the application of those methods in practice unsuitable. Furthermore, the methods of treating waste water with air or molecular oxygen have been known, in which the disintegration of noxious materials contained in the waste water has been achieved in the presence of specific catalysts, especially in so-called Katox-method.

In the method of treatment of waste water according to the present invention the utilization of specific catalysts is not required. It has been proved that during the oxidation reaction the flying dust suspended in the concentrated slime-containing water obviously acts as catalyst. Therefore noxious materials, which, upon the introduction of the concentrated slime-containing water into the slime-depositing means or filtration means, or during burning out of the slime, can be absorbed by water or air, become oxidized. Reaction products resulted in the oxidation of $H_2S$ and HCN are elementary sulfur, thiosulfate, sulfate and thiocyanite. This means that such connections occur, which under normal conditions, have practically no vapor pressure, and therefore they do not cause air contamination. For carrying out the oxidation of waste water, air is, of course, preferable because of low costs of the process.

As mentioned above it is specifically advantageous to use two or more oxidation stages, in which each oxidation reactor is provided with the assigned air-blowing means as well as with the respective additional mechanical conduits or pipes to ensure good admixing of the reaction mixtures.

The amount of the oxygen-carrying medium in said oxidation step is between 1 and 50 $Nm^3$, preferably between 3 and 20 $Nm^3$ per 1 $m^3$ of the concentrated slime-containing water.

An exhaust air is obtained in said oxidation step, said exhaust air being partially recycled into at least one of said oxidation stages.

The exhaust air is introduced into at least two oxidation stages in streams flowing in the same direction or in counter directions.

The exhaust air may be utilized within the plant for a gasification of row gas as combustion air.

A surplus water obtained in the filter means or slime-depositing means surplus water may be at least partially recycled into said plant as custom water.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE of the drawing is a flow chart diagram illustrating the method of processing waste water produced in a plant for a gasification of coal during a direct washing of raw gas with water, according to the present invention.

DETAILED DESCRIPTION OF THE PREFERRED EMBODIMENT

Referring now to the drawing in detail, reference numeral 1 designates a conduit, through which waste water, discharged from the direct washing stage of washing raw gas in a commonly known coal-gasification plant (not shown) is fed into a settling tank 2. A disintegration of the waste water into a clarified washing water and concentrated slime-containing water takes place in settling tank 2 in the known fashion. The clarified washing water is drawn off via an overflow gutter 3 from tank 2 into a conduit 4 and is pumped back into the non-illustrated herein direct washing stage of the treatment of row gas. The concentrated slime-containing water is discharged from the bottom of the settling tank 2 into a conduit 6 and from thence is pumped by a pump 5 and via conduit 6' into oxidation reactors 7,7', in which a two-stage oxidation is performed. The settling tank 2 can be provided with a special shield or cover (not shown) to prevent escaping gaseous noxious materials formed during the water clarification process into atmosphere. The streams of concentrated slime-containing water are fed into oxidation reactors 7, 7' connected to each other in series. The oxidation reactors 7, 7' are therefore filled with slime-containing water. Air or oxygen or ozonized air required for the oxidation process is charged into oxidation reactors 7, via a conduit 8 and a blower 9 under required pressure. The introduction of air into the both oxidation reactors 7, 7' is provided by distributing conduits 10 and 11. At the end of each distributing conduit 10, 11 nozzles 12 are arranged. Nozzles 12, which can be of any suitable conventional construction, serve the purpose of a fine bubbled distribution of injected air. The air bubbles are directed upwardly.

An exhaust air produced during the oxidation process contains traces of $H_2S$, HCN and $NH_3$ and is discharged from oxidation reactors 7 via a conduit 13. The exhaust air is utilized as a combustion air within the whole plant, and particularly within the plant for gasification of coal. The treated concentrated slime-containing water is discharged via a conduit 14 from the second oxidation reactor 7, and can be selectively fed either into a slime depositing tank 16 via a conduit 15 or into a filter device 18 via a conduit 17. A known revolving filter can be utilized as a filter device 18 in the exemplified embodiment.

A further settling and evaporation of slime takes place in tank 16 for a longer period of time in the known fashion. The surplus water generated in tank 16 is discharged from the latter via a conduit 19 and can be recycled in the plant as custom water. If the slime-depositing tank is not desired the concentrated slime-containing water is fed into filter device 18. A filter cake resulted from the filtering process in filter device 18 is removed therefrom via a conduit 20. This filter cakes is deposited without affecting the environment. This cake can be also burned out without geopardizing the enviroment. The filtrate produced during the filtration process in filter device 18 is removed from the latter via a conduit 21 can be also eventually recycled into the whole plant or installation. If the utilization of surplus water from conduits 19 and 21 as a usable or custom water is impossible, this water is expelled as exhaust water. However, such an exhaust water is significantly settled due to the method according to the invention.

The efficiency of the inventive method is illustrated by the following example.

The concentrated slime-containing water for processing row gas is originated from a plant for a gasification of coal operated according to Koppers-Totzek process The slime-containing water discharged from settling tank 2 through conduit 6 has the following composition:

| pH | | 8,0 |
|---|---|---|
| Solids | g/l | 205 |
| $NH_4^+$ | mg/l | 134 |
| $S^{--}$ | " | 0,7 |
| $SO_3^{--}$ | " | 1,4 |
| $S_2O_3^{--}$ | " | 3,6 |
| $SO_4^{--}$ | " | 746 |
| $CN^-$ | " | 8,6 |
| $SCN^-$ | " | 6,9 |

The amount $15^{m3/h}$ of the concentrated slime-containing water at the temperature of about 40° C. is fed into the first oxidation reactor 7 of the first oxidation stage. This first reactor 7 has a clear diameter of 1.20 m and the height of 3.50 m. About 75 $Nm^3/h$ of air in the form of bubbles is blown via distributing conduit 11 into the first reactor 7. The slime-containing water is then directed into the second oxidation stage represented by the second oxidation reactor 7' connected to the first reactor 7 in series. The dimensions of the second reactor 7' are identical to those of first reactor 7. 75 $Nm^3/h$ of air is blown into reactor 7' via distributing conduit 10. The total exhaust air produced in the two-stage oxidation process is discharged through conduit 13 and is then used as combustion air in a steam-producing plant. The slime-containing water resulted from the oxidation process is removed from reactor 7' via conduit 14. This treated slime-containing water has the following composition:

| | | |
|---|---|---|
| pH | | 7,9 |
| $NH_4^+$ | mg/l | 128 |
| $S^{--}$ | " | <0,1 |
| $SO_3^{--}$ | " | <0,1 |
| $S_2O_3^{--}$ | " | 2,1 |
| $SO_4^{--}$ | " | 752 |
| $CN^-$ | " | <0,2 |
| $SCN^-$ | " | 16,2 |
| Solids | g/l | 210 |

Upon the feeding of so-treated slime-containing water into the slime-depositing tank 16, an odor of $H_2S$ or HCN can be detected yet during the application of the water into that tank. This means that the contamination of the atmosphere and ground waters can be efficiently prevented by the method according to the invention.

It will be understood that each of the elements described above, or two or more together, may also find a useful application in other types of method of treating waste water obtained during the washing of raw gas in coal-gasification plants differing from the types described above.

While the invention has been illustrated and described as embodied in a method of processing waste water obtained during the washing of raw gas in a plant for a gasification of coal.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of treatment of waste water obtained in a direct washing of a gas with water in a plant for a gasification of gas, comprising the steps of treating waste water in a settling tank to obtain a clarified water, which is recycled to the plant, and a concentrated slime-containing water; subjecting said concentrated slime-containing water to oxidation only with an oxygen-carrying medium at the temperature from 20° C. to 80° C. in at least two oxidation stages; and conveying a resultant slime-containing water produced in said oxidation stages for further treatment, wherein an exhaust air is obtained in said oxidation step, said exhaust air being partially recycled into at least one of said oxidation stages.

2. The method as defined in claim 1, wherein said temperatures are within the range 35° C.-70° C.

3. The method as defined in claim 1, wherein said medium is atmospheric air.

4. The method as defined in claim 1, wherein said medium is pure oxygen.

5. The method as defined in claim 1, wherein said medium is ozonized air.

6. The method as defined in claim 1, wherein said resultant slime-containing water is conveyed to a slime-depositing means.

7. The method as defined in claim 6, wherein a surplus water is obtained in said slime-depositing means, said surplus water being at least partially recycled into said plant as custom water.

8. The method as defined in claim 1, wherein said resultant slime-containing water is conveyed to a filter means.

9. The method as defined in claim 8, wherein a surplus water is obtained in said filter means, said surplus water being at least partially recycled into said plant as custom water.

10. The method as defined in claim 1, wherein the amount of said medium in said oxidation step is between 1 and 50 $Nm^3$ per 1 $m^3$ of the concentrated slime-containing water.

11. The method as defined in claim 10, wherein the amount of said medium is said oxidation step is between 3 and 20 $Nm^3$ per 1 $m^3$ of the concentrated slime-containing water.

12. The method as defined in claim 1, wherein the exhaust air is introduced into at least two oxidation stages in streams flowing in the same direction.

13. The method as defined in claim 1, wherein the exhaust air is introduced into at least two oxidation stages in streams flowing in counter directions.

* * * * *